US009002057B2

(12) United States Patent
Outtagarts et al.

(10) Patent No.: US 9,002,057 B2
(45) Date of Patent: Apr. 7, 2015

(54) COLLABORATIVE CAMERA SERVICES FOR DISTRIBUTED REAL-TIME OBJECT ANALYSIS

(75) Inventors: Abdelkader Outtagarts, Antony (FR); Muy-Chu Ly, Palaiseau (FR)

(73) Assignee: Alcatel Lucent, Boulogne-Billancourt (FR)

( * ) Notice: Subject to any disclaimer, the term of this patent is extended or adjusted under 35 U.S.C. 154(b) by 362 days.

(21) Appl. No.: 13/053,591

(22) Filed: Mar. 22, 2011

(65) Prior Publication Data

US 2012/0243730 A1  Sep. 27, 2012

(51) Int. Cl.
  *G06K 9/00* (2006.01)
  *G06T 7/20* (2006.01)
(52) U.S. Cl.
  CPC .......... *G06K 9/00771* (2013.01); *G06T 7/2093* (2013.01)
(58) Field of Classification Search
  CPC .................... G06T 7/2093; G06T 2207/10016; G06T 2207/30232; G06K 9/00771; G01S 3/7864
  USPC .................... 382/103; 348/139, 143, 159, 169
  See application file for complete search history.

(56) References Cited

U.S. PATENT DOCUMENTS

| | | | |
|---|---|---|---|
| 6,151,066 A * | 11/2000 | Ito | 348/169 |
| 7,583,815 B2 * | 9/2009 | Zhang et al. | 382/103 |
| 8,180,107 B2 * | 5/2012 | Broaddus et al. | 382/103 |
| 8,249,300 B2 * | 8/2012 | Lee et al. | 382/103 |
| 8,284,254 B2 * | 10/2012 | Romanowich et al. | 348/154 |
| 8,625,843 B2 * | 1/2014 | Oosawa | 382/103 |
| 2004/0194129 A1 * | 9/2004 | Carlbom et al. | 725/32 |
| 2005/0012817 A1 * | 1/2005 | Hampapur et al. | 348/143 |
| 2009/0169053 A1 | 7/2009 | Vendrig | |
| 2010/0066835 A1 | 3/2010 | Colciago | |
| 2010/0097472 A1 * | 4/2010 | Chathukutty et al. | 348/159 |

OTHER PUBLICATIONS

Zhou et al., "A Master-Slave System to Acquire Biometric Imagery of Humans at Distance", IWVS'03, Nov. 7, 2003.*
Kang et al., "Gate-to-gate automated video tracking and location", Proceedings of the FAA's 3rd International Aviation Security Technology Symposium. 2001.*
Qureshi et al., "Smart Camera Networks in Virtual Reality", 2007, Distributed Smart Cameras, 2007. ICDSC '07. First ACM/IEEE International Conference on, 87-94.*

(Continued)

Primary Examiner — Katrina Fujita
(74) Attorney, Agent, or Firm — Wall + Tong, LLP

(57) ABSTRACT

A collaborative object analysis capability is depicted and described herein. The collaborative object analysis capability enables a group of cameras to collaboratively analyze an object, even when the object is in motion. The analysis of an object may include one or more of identification of the object, tracking of the object while the object is in motion, analysis of one or more characteristics of the object, and the like. In general, a camera is configured to discover the camera capability information for one or more neighboring cameras, and to generate, on the basis of such camera capability information, one or more actions to be performed by one or more neighboring cameras to facilitate object analysis. The collaborative object analysis capability also enables additional functions related to object analysis, such as alerting functions, archiving functions (e.g., storing captured video, object tracking information, object recognition information, and so on), and the like.

20 Claims, 8 Drawing Sheets

(56) References Cited

OTHER PUBLICATIONS

Qureshi, "On the Role of Negotiations in Ad Hoc Networks of Smart Cameras", Jun. 2010, Distributed Computing in Sensor Systems Workshops (DCOSSW), 2010 6th IEEE International Conference on, 1-2.*

Y. Wang, et al, "Cooperative Object Tracking and Event Detection with Wireless Smart Cameras," 2009 Advanced Video and Signal Based Surveillance, IEEE, pp. 394-399.

* cited by examiner

```xml
<?xml version="1.0"?>                 521
<!DOCTYPE myMessage SYSTEM "dsc.dtd">   522
<CAMERA_MESSAGE>
 <MESSAGE message="DC_CAMERA">
  <DC_CAMERA>
   <CAMERA_DATA>
    <NAME>camera i</NAME>
    <ID>a45</ID>
    <POSITION>30°</POSITION>
    <NEIGHBOR>camera j, camera f, camera 29</NEIGHBOR>
    <HOME>hosti:5050</HOME>
    <TASKS task="1" num="0">
    <NEXT_HOST>camera f</NEXT_HOST>
    <CAMERA_CODE>
     <![CDATA[
include <stdio.h>
include <math.h>
int main()
{
...
CODE OF TASK 1 return 0;
}
   ]]>
   </CAMERA_CODE>
   </TASKS>
    <TASKS task="k" num="0">
    <NEXT_HOST>camera k</NEXT_HOST>
    <CAMERA_CODE>
     <![CDATA[ include <stdio.h>
include <math.h>
int main()
{
...
#CODE OF TASK k
     return 0;
}
   ]]>
   </CAMERA_CODE>
   </TASKS>
   </CAMERA_DATA>
  </DC_CAMERA>
 </MESSAGE>
</CAMERA_MESSAGE>
```

COLLABORATIVE CAMERA SERVICES FOR DISTRIBUTED REAL-TIME OBJECT ANALYSIS

TECHNICAL FIELD

The invention relates generally to analyzing objects using cameras and, more specifically but not exclusively, to collaborative analysis of objects using cameras.

BACKGROUND

In law enforcement, security, and other related environments, usage of cameras is increasing and will continue to increase in the future to cover large areas using large numbers of cameras.

SUMMARY

Various deficiencies in the prior art are addressed by embodiments for providing a collaborative object analysis capability between cameras.

In one embodiment, an apparatus for facilitating analysis of an object by a plurality of cameras includes a processor and memory configured to generate an action at a first camera where the action is generated using camera capability information indicative of at least one camera capability of a second camera and where the action is adapted for use by the second camera to facilitate analysis of the object, and propagate the action from the first camera toward the second camera.

In one embodiment, a method for facilitating analysis of an object by a plurality of cameras includes generating an action at a first camera where the action is generated using camera capability information indicative of at least one camera capability of a second camera and where the action is adapted for use by the second camera to facilitate analysis of the object, and propagating the action from the first camera toward the second camera.

In one embodiment, an apparatus for facilitating analysis of an object by a plurality of cameras includes a processor and memory configured to receive, from a first camera at a second camera, an action associated with analysis of an object detected by the first camera, and process the action for configuring the second camera in a manner for facilitating analysis of the object by the second camera.

In one embodiment, a method for facilitating analysis of an object by a plurality of cameras includes receiving, from a first camera at a second camera, an action associated with analysis of an object detected by the first camera, and processing the action for configuring the second camera in a manner for facilitating analysis of the object by the second camera.

BRIEF DESCRIPTION OF THE DRAWINGS

The teachings herein can be readily understood by considering the following detailed description in conjunction with the accompanying drawings, in which:

FIGS. 5A and 5B depict an exemplary use of XML for encoding camera information exchanged between cameras of a collaborative object analysis system;

To facilitate understanding, identical reference numerals have been used, where possible, to designate identical elements that are common to the figures.

DETAILED DESCRIPTION OF ILLUSTRATIVE EMBODIMENTS

A collaborative object analysis capability is depicted and described herein.

In at least some embodiments, the collaborative object analysis capability enables a group of cameras to collaboratively analyze an object, even when the object is in motion. The analysis of an object may include one or more of identification of the object, tracking of the object while the object is in motion, analysis of one or more characteristics of the object, and the like, as well as various combinations thereof. The collaborative object analysis capability also enables additional functions related to analysis of an object, such as alerting functions, archiving functions (e.g., storing captured video, object tracking information, object recognition information, and the like), and the like, as well as various combinations thereof.

Although the collaborative object analysis capability is primarily depicted and described herein within the context of providing collaborative analysis of certain types of objects within certain types of environments, it will be appreciated that the collaborative object analysis capability may be utilized for providing collaborative analysis of various other types of objects within various other types of environments.

Figure 1:
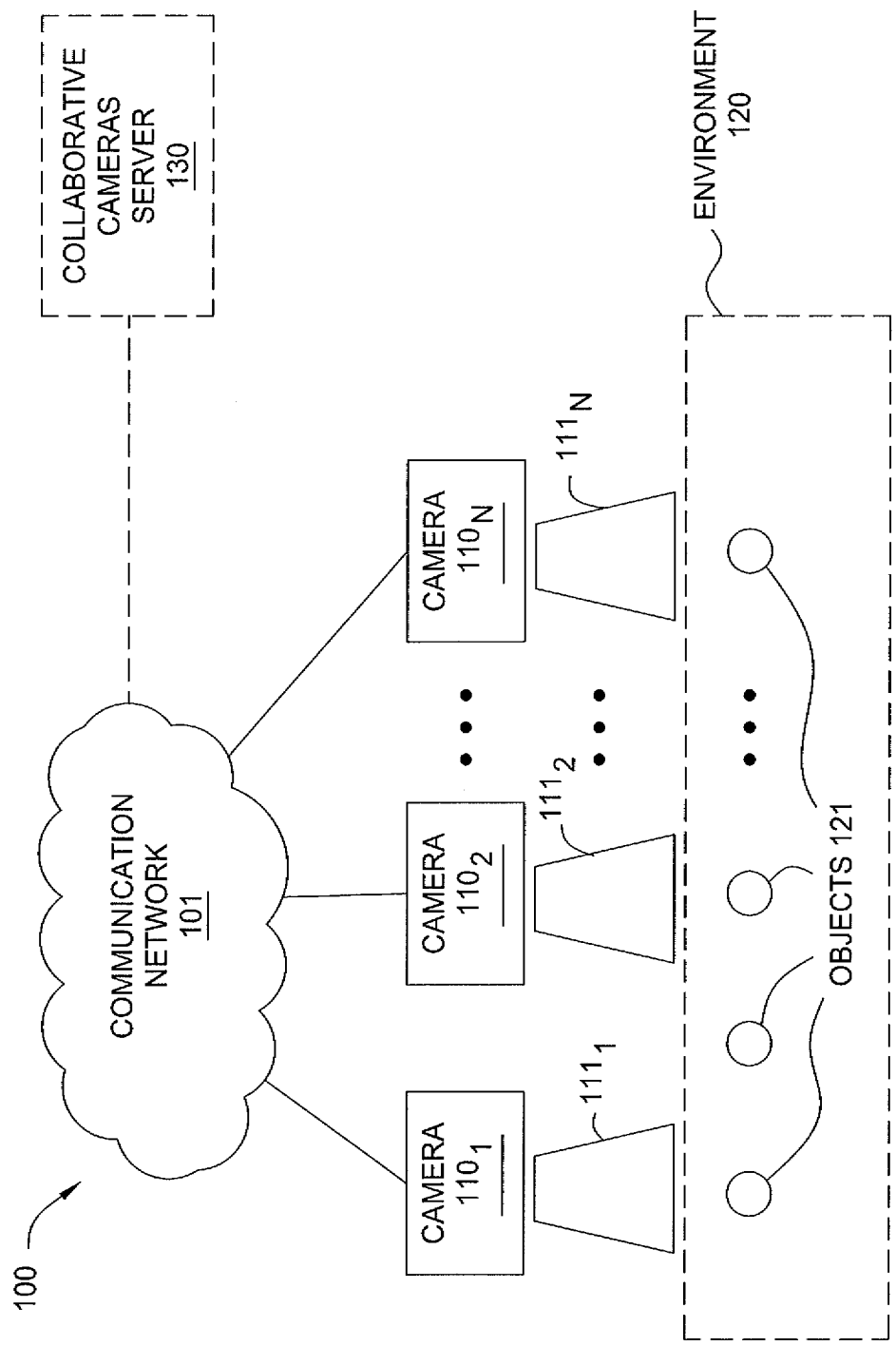
FIG. 1 depicts an exemplary collaborative object analysis system configured to provide collaborative analysis of objects in an environment.

FIG. 1 depicts an exemplary collaborative object analysis system configured to provide collaborative analysis of objects in an environment.

As depicted in FIG. 1, an exemplary collaborative object analysis system 100 includes a communication network 101 configured to support communications for a plurality of cameras 110₁-110_N (collectively, cameras 110) where the cameras 110 are configured for collaborating to monitor an environment 120, including collaborating to analyze objects 121 located within the environment 120. The exemplary collaborative object analysis system 100 also may include a collaborative cameras server 130.

The cameras 110 are configured to collaborate in a manner facilitating collaborative analysis of objects 121 located within the environment 120.

The cameras 110 are configured to capture video of environment 120, including video of objects 121 to be analyzed. The video capture mechanisms of cameras 110 may include any suitable video capture capabilities. For example, a camera 110 may be configured to support capture of standard definition video, high definition video, and the like, as well as combinations thereof. As depicted in FIG. 1, each of the cameras 110₁-110_N has a field of vision 111₁-111_N (collectively, fields of vision 111) associated therewith, respectively, which indicate the portions of the environment from which the cameras 110 capture video, respectively.

The cameras 110 may include camera orientation control capabilities for controlling camera orientation. For example, a camera 110 may include one or more motors or other motion control elements configured for controlling one or more of the pan, tilt, and/or zoom settings of the camera 110. For example, a camera 110 may be mounted on or otherwise associated with a camera orientation control device configured for controlling orientation of the camera 110 (e.g., configured for controlling one or more of the pan, tilt, and/or zoom settings of the camera 110). In this manner, the cameras 110$_1$-110$_N$ also may be configured to control various aspects of the fields of vision 110$_1$-110$_N$, respectively (e.g., size, the portion of environment 120 from which video is captured, and the like, as well as various combinations thereof).

The cameras 110 are configured to support various object analysis capabilities. For example, a camera 110 may include one or more of video analysis capabilities, motion tracking capabilities, object recognition capabilities, face tracking capabilities, face recognition capabilities, and the like, as well as various combinations thereof. It will be appreciated that various cameras 110 may support various other capabilities which may be useful within the context of object analysis.

The cameras 110 are configured to communicate with each other for purposes of exchanging information associated with object analysis. For example, the cameras 110 may communicate for exchanging their camera capability information, actions generated by the cameras 110 to facilitate analysis of objects, and the like, as well as various combinations thereof. The cameras 110 may communicate with each other in any suitable manner (e.g., using any suitable communication network, using direct wired and/or wireless communications capabilities, and the like, as well as various combinations thereof).

In one embodiment, as depicted in FIG. 1, the cameras 110 are configured to communicate via communication network 101 for collaborating to analyze the objects 121 which may be in motion. The communication network 101 may be any type of communication network suitable for enabling inter-camera communication between cameras 110 (e.g., a proprietary network, a private network provided via the Internet using Virtual Private Networking (VPN) capabilities and/or other similar capabilities, and the like) and management communications between cameras 110 and collaborative cameras server 130.

In one embodiment, omitted from FIG. 1 for purposes of clarity, at least some the cameras 110 may be configured to communicate with each other directly. For example, cameras 110 may communicate via a wired or wireless network dedicated for communication between cameras 110. For example, at least some of the cameras 110 may communicate with each other via cellular-based or WiFi-based communications. The cameras 110 may be configured to communicate with each other in any other suitable manner.

The cameras 110 are configured to store various types of information associated with collaborative object analysis. For example, a camera 110 may be configured to store video captured by the camera 110 (e.g., all captured video, subsets of captured video, and the like), camera capability information associated with the camera 110 and/or neighboring cameras 110, actions generated by the camera 110 for facilitating object analysis, actions generated by neighboring cameras 110 and provided to the camera 110 for facilitating object analysis, and the like, as well as various combinations thereof. The cameras 110 may include any suitable storage capabilities for storing such information (e.g., random access memory (RAM), read only memory (ROM), and the like).

It will be appreciated that one or more of the cameras 110 may include various combinations of such capabilities.

The cameras 110 each may include various other capabilities adapted for use in providing various collaborative object analysis functions depicted and described herein. An exemplary camera 110 is depicted and described herein with respect to FIG. 3. Although primarily depicted and described herein with respect to use of video cameras, it is noted that one or more of the cameras 110 may be still cameras and/or may be video cameras supporting still image capture capabilities.

Although primarily depicted and described herein with respect to use of video cameras to capture video content, it is noted that one or more of the video cameras also may be configured to capture other types of information and/or may be associated with one or more other devices configured to capture other types of information. For example, one or more of the cameras 110 may be configured to capture content in addition to video and/or may be associated with one or more other devices configured to capture content in addition to video (e.g., content such as audio and the like). For example, one or more of the cameras 110 may include or otherwise be associated with one or more sensors (omitted for purposes of clarity) configured for capturing other types of information which may be useful in collaborative object analysis. For example, such sensors may include one or more of motion detectors for detecting objects to be analyzed, heat sensors for tracking movement of objects having heat signatures (e.g., people, vehicles, and the like), and the like, as well as various combinations thereof.

The environment 120 may include any suitable environment in which cameras 110 may be deployed for use in analyzing the environment 120 and objects 121 included within environment 120. The environment 120 may be any suitable size, which may range from relatively small areas (e.g., a portion of a building, a building, and the like) to moderately sized areas (e.g., a group of buildings, an airport, an amusement park, a street, and the like) to relatively large areas (e.g., a portion of a city, a city, and the like), and beyond. For example, cameras 110 may be deployed to provide security within a building, to provide security within an airport, for monitoring a city or portions of a city, and the like.

The objects 121 may include any objects which may be analyzed by a camera. For example, the objects 121 may include people, vehicles, items, and the like, as well as combinations thereof. The objects 121 may be analyzed by cameras 110 while motionless and/or while in motion (including when the motion of the objects 121 is changing over time). The objects 121 may include any other type(s) of objects which may be analyzed by cameras 110.

The collaborative cameras server 130 may be configured to provide various functions in support of the collaborative object analysis capability. For example, the collaborative cameras server 130 may be configured to provide one or more of camera configuration functions (e.g., for configuring the capabilities of cameras 110), camera configuration reporting functions (e.g., for informing cameras 110 about capabilities of other cameras 110), video analysis functions, alerting functions (e.g., for initiating alerts in response to detection of events associated with tracking of objects in motion), archiving functions (e.g., for storing various types of information associated with object analysis performed by cameras 110), and the like, as well as various combinations thereof. The collaborative cameras server 130 may communicate with cameras 110 in any suitable manner (e.g., via communication network 101 as depicted in FIG. 1, via direct and/or indirect wired and/or wireless communications capabilities, and the like, as well as various combinations thereof). In one embodiment, at least a portion of the functions depicted and described herein as being performed by the cameras 110 may be performed by the collaborative cameras server 130 (e.g., via communications between the cameras 110 and the collaborative cameras server 130). The collaborative cameras server 130 may support various other functions depicted and described herein.

Figure 2:
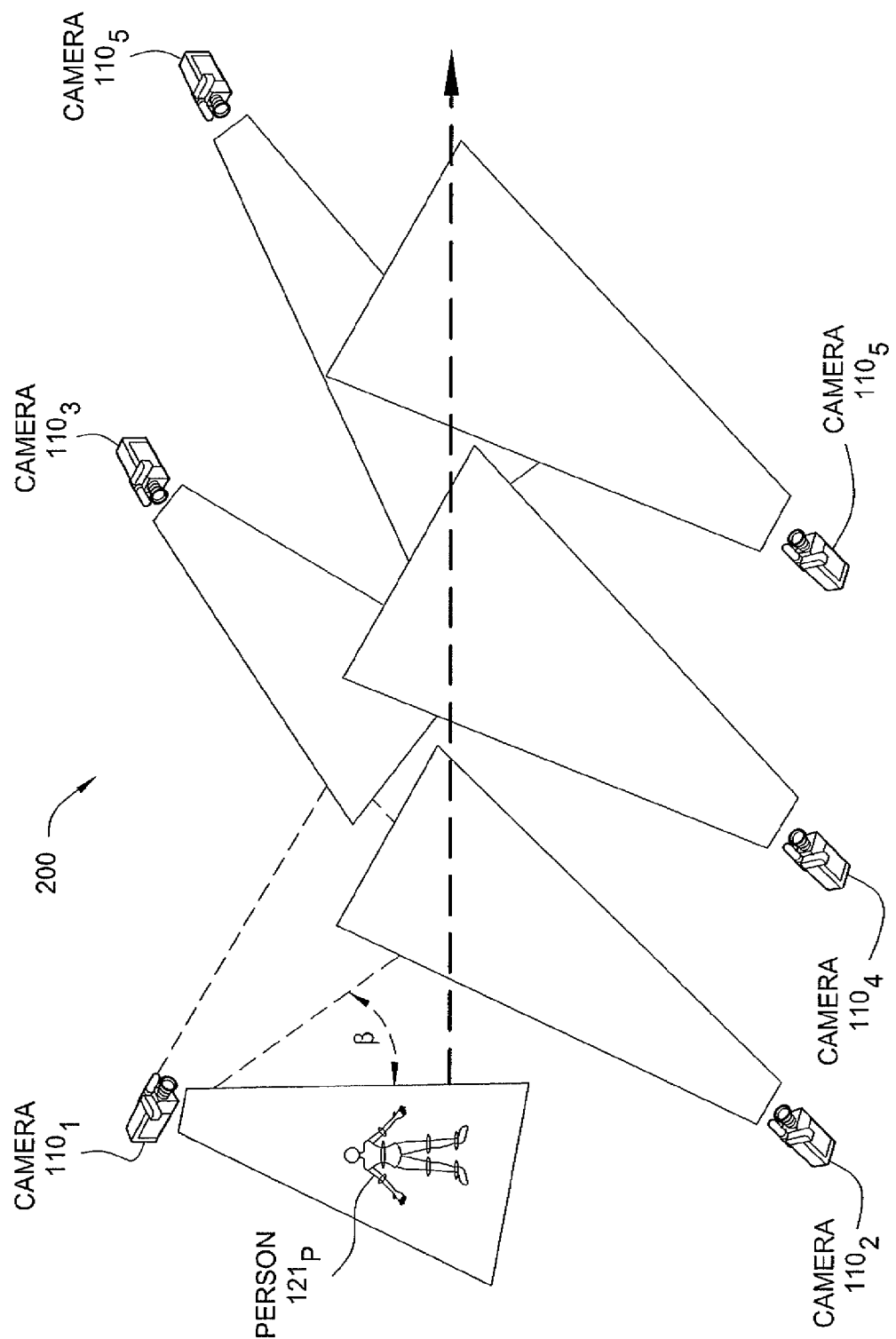
FIG. 2 depicts an exemplary use of a collaborative object analysis system configured to provide collaborative analysis of an object in motion.

An exemplary use of an exemplary collaborative object analysis system to analyze an object in motion is depicted and described with respect to FIG. 2.

FIG. 2 depicts an exemplary use of a collaborative object analysis system configured to provide collaborative analysis of an object in motion.

As depicted in FIG. 2, six cameras $110_1$-$110_6$ are arranged for tracking a person $121_P$ moving along an indicated trajectory (indicated by the dashed line).

The cameras $110_1$-$110_6$ each have a field of vision $111_1$-$111_6$ associated therewith, respectively, as indicated by the shading shown as emanating from each of the cameras $110_1$-$110_6$ toward the direction of the trajectory of person $121_P$. As indicated with respect to the field of vision $111_1$ of camera $110_1$, one or more of cameras $110_1$-$110_6$ is configured to move its field of vision (e.g., to track the person $121_P$ while the person $121_P$ moves along the indicated trajectory). For example, the field of vision $111_1$ of camera $110_1$ is illustrated as moving from left to right along the indicated trajectory of person $121_P$ (the initial setting being indicated by shading solid-line boundary of the field of vision, and the final setting being indicated by a dotted-line boundary of the field of vision). As described with respect to FIG. 1, one or more of the cameras 110 is configured to be able to adjust its associated field of vision 111 in one or more dimensions (e.g., using various pan, tilt, and/or zoom settings of the cameras $110_1$-$110_6$).

The cameras $110_1$-$110_6$ are configured for collaborating to analyze the person $121_P$ as person $121_P$ moves along the indicated trajectory, as may be understood from the following example illustrating various functions of the collaborative object analysis capability. The first camera $110_1$ detects person $121_P$, captures video of person $121_P$, begins analyzing the video of person $121_P$, and performs a process for generating and propagating one or more actions to be executed by one or more of neighboring cameras $110_2$-$110_6$. In this example, assume that first camera $110_1$ generates actions for each of second camera $110_2$, third camera $110_3$, and fourth camera $110_4$, and sends the generated actions to those cameras. The second camera $110_2$ receives the actions from the first camera $110_1$, executes the actions intended for itself, detects person $121_P$, captures video of person $121_P$, begins analyzing the video of person $121_P$, and performs a process for generating and propagating one or more actions to be executed by one or more of neighboring cameras $110_1$ and $110_3$-$110_6$. In this example, assume that second camera $110_2$ generates actions for each of first camera $110_1$, third camera $110_3$, fourth camera $110_4$, and sixth camera $110_6$, and sends the generated actions to those cameras. The third camera $110_3$ receives the actions from the first camera $110_1$ and second camera $110_2$, executes at least some of the actions intended for itself (and, optionally, one or more actions intended for one or more other cameras), detects person $121_P$, captures video of person $121_P$, begins analyzing the video of person $121_P$, and performs a process for generating and propagating one or more actions to be executed by one or more of neighboring cameras $110_1$-$110_2$ and $110_4$-$110_6$. In this example, assume that third camera $110_3$ generates actions for each of second camera $110_2$, fourth camera $110_4$, and fifth camera $110_5$, and sends the generated actions to those cameras. The collaborative tracking of person $121_P$ by the cameras $110_1$-$110_6$ continues in this manner, with the cameras $110_1$-$110_6$ cooperating to analyze various aspects of the person $121_P$ (e.g., such as tracking the motion of person $121_P$ along the indicated trajectory, using zoom and face recognition capabilities available in the third camera $110_3$ and fifth camera $110_5$ to recognize the person $121_P$, and the like, as well as various combinations thereof).

Although primarily depicted and described with respect to a specific implementation in which six cameras are arranged in a particular manner and configured for collaborating to analyze a person in motion along a trajectory adjacent to each of the six cameras, it will be appreciated that FIG. 2 merely represents one example illustrating collaborative analysis of an object by a group of cameras. The various capabilities supported by cameras 110 for participating in collaborative analysis of objects 121 are described in more detail hereinbelow.

As indicated hereinabove, each camera 110 is configured for performing a process for facilitating collaborative analysis of an object 121.

In one embodiment, a camera 110, upon detecting an object 121 to be tracked, may perform a process including steps of analyzing the scene to obtain object analysis information, retrieving camera capability information for one or more neighboring cameras 110 which may collaborate with the camera 110 to provide collaborative analysis of the object 121, identifying one or more neighboring cameras 110 which may collaborate with the camera 110 to provide collaborative analysis of the object 121, determining initial configurations of the identified neighboring cameras 110, computing preferred configurations for the identified neighboring cameras 110, generating actions to be performed by the identified neighboring cameras 110 for collaborative analysis of the object 121, and propagating the generated actions to the neighboring cameras 110 for configuring the neighboring cameras 110 to facilitate collaborative analysis of the object 121. It will be appreciated that such a process (or at least various portions thereof) may be performed by each camera 110 before, while, and/or after the object 121 is within the vicinity of the camera 110.

In one embodiment, a camera 110, upon receiving one or more actions from a neighboring camera 110, may initiate various processes for facilitating collaborative analysis of the object 121. For example, the camera 110 may identify ones of the received actions intended for itself and analyze and execute the identified action(s) for purposes of configuring itself to analyze the object 121. For example, the camera 110 may perform at least some of the functions described as being performed by a camera 110 upon detecting an object 121 (e.g., for enabling the camera 110 to specify configuration of its own neighboring cameras 110, which may include neighboring cameras 110 other than the camera(s) 110 from which the actions were received). A camera 110, upon receiving one or more actions from a neighboring camera 110, may initiate various other processes as depicted and described herein.

A camera 110, when analyzing an object 121 within its field of vision 111, may analyze the object 121 (and, optionally, the surrounding environment 120) to obtain object analysis information associated with the object 121. This may include one or more of detection of the object 121, determining location information associated with the object 121 (e.g., a current location of object 121, one or more expected future locations of object 121, and the like), determining motion information associated with the motion of the object 121 (e.g., the trajectory of the object 121, the speed of the object 121, and the like, as well as various combinations thereof), running embedded image processing analysis (e.g., one or more of object recognition processing, face detection processing, face recognition processing, and so forth), running one or more other types of embedded analysis, and the like, as well as various combinations thereof. As described herein, at least a portion of the object analysis information may be utilized for one or more of identifying one or more neighboring cameras 110 which may collaborate with the camera 110 to provide collaborative analysis of the object 121, generating actions to be performed by the identified neighboring cameras 110 for collaborative analysis of the object 121, and the like, as well as various combinations thereof.

A camera 110, for performing functions in support of collaborative analysis of an object 121, may retrieve camera capability information for one or more neighboring cameras 110 which may collaborate with the camera 110 to provide collaborative analysis of the object 121.

The camera capability information associated with a camera 110 may include one or more of camera type information of the camera 110 (e.g., information indicative as to whether the camera 110 is a smart camera, an IP camera configured for storing video, a standard definition camera, a high definition camera, and the like), camera position information of the camera 110 (e.g., the geographic location of the camera 110, the location of the camera 110 relative to one or more other cameras 110, and the like), camera movement capability information for the camera 110 (e.g., range of pan, tilt, zoom, and the like), software capabilities of the camera 110 (e.g., which type(s) of embedded analysis is supported), hardware capabilities of the camera 110 (e.g., video processing speeds), communications capabilities of the camera 110, and the like, as well as various combinations thereof.

The camera capability information for neighboring cameras 110 may be obtained by a camera 110 in any suitable manner. The camera capability information may be obtained locally (e.g., from memory within the camera 110) and/or remotely (e.g., from the neighboring cameras 110, from the collaborative camera server 130 and/or any other central system, and the like, as well as various combinations thereof). In one embodiment, the cameras 110 each are configured to distribute their own camera capability information to neighboring cameras 110, such that each camera 110 may maintain a repository of camera capability information for its neighboring cameras 110. In one embodiment, a camera 110 distributes its camera capability information to neighboring cameras 110 by broadcasting its camera capability information such that the camera capability information may be received and stored by the neighboring cameras 110. In one embodiment, a camera 110 initiates polling for requesting camera capability information from neighboring cameras 110. The broadcasting of and/or polling for camera capability information may be performed at any suitable time (e.g., periodically, in response to a trigger condition, and the like, as well as various combinations thereof). In this manner, as camera capability information of neighboring cameras 110 is received and stored by the cameras 110, each camera 110 obtains and stores camera capability information for its neighboring cameras 110, which may then be used by the cameras 110 for performing various functions in support of collaborative analysis of objects 121. The neighboring cameras 110 may include all other cameras 110, a subset of the other cameras 110 (e.g., a particular number of neighboring cameras 110, any neighboring cameras 110 within a threshold distance of the camera 110, and the like), and the like. The camera capability information of neighboring cameras 110 may be obtained by a camera 110, when performing functions in support of collaborative analysis of an object 121, in any other suitable manner.

A camera 110, when performing functions in support of collaborative analysis of an object 121, may identify one or more neighboring cameras 110 which may collaborate with the camera 110 to provide collaborative analysis of the object 121. The identification of the one or more neighboring cameras 110 may be based on the object analysis information and/or the camera capability information associated with neighboring cameras 110. For example, information indicative of the location (e.g., current location) and/or motion of the object 121 (e.g., trajectory, speed, and the like) and the physical positions of the neighboring cameras 110 may be used to identify one or more of the neighboring cameras 110 which are expected to be able to capture video of the object 121 for facilitating analysis of the object 121. For example, information indicative of the type of object to be analyzed (e.g., a person, vehicle, and so forth) and camera capability information indicative of neighboring cameras supporting recognition of that type of object and/or one or more characteristics of that type of object (e.g., vehicle recognition for identifying a vehicle, facial recognition for tracking a person, and so forth) may be used to identify one or more of the neighboring cameras 110 which are expected to be able to facilitate analysis of the object 121. It will be appreciated that these are merely a few examples of the various ways in which object analysis information associated with an object 121 and/or camera capability information associated with neighboring cameras 110 may be used by a camera 110 for identifying one or more neighboring cameras 110 which may collaborate with the camera 110 to provide collaborative analysis of the object 121.

A camera 110, when performing functions in support of collaborative analysis of an object 121, may determine initial configurations of neighboring cameras 110 identified by the camera 110 as neighboring cameras 110 to collaborate with the camera 110 to provide collaborative analysis of the object 121.

The initial configuration information for a neighboring camera 110 may include camera orientation information (e.g., the current pan, tilt, and/or zoom settings of the neighboring camera 110), image capture settings (e.g., set to capture standard definition or high definition video, set to record video for a certain length of time, and the like), camera analysis settings information (e.g., which types of embedded analysis functions are currently activated and/or deactivated on the neighboring camera 110), and the like, as well as various combinations thereof.

The initial configurations of the neighboring cameras 110 may be determined using one or more of the camera capability information of the neighboring cameras 110, actions received at the camera 110 from one or more neighboring cameras 110 (e.g., where other neighboring cameras 110 are performing similar processes and provide actions to neighboring cameras which the neighboring cameras 110 then use to configured themselves), by querying the neighboring cameras 110 for initial configuration information, and the like, as well as various combinations thereof.

A camera 110, when performing functions in support of collaborative analysis of an object 121, may determine preferred configurations of neighboring cameras 110 identified by the camera 110 as neighboring cameras 110 to collaborate with the camera 110 to provide collaborative analysis of the object 121.

The preferred configuration information for a neighboring camera 110, like the initial configuration information for a neighboring camera 110, may include camera orientation information (e.g., the current pan, tilt, and/or zoom settings of the camera 110), image capture settings (e.g., set to capture standard definition or high definition video, set to record video for a certain length of time, and the like), camera analysis settings information (e.g., which types of embedded analysis functions are currently activated and/or deactivated on the neighboring camera 110), and the like, as well as various combinations thereof.

The preferred configurations of the neighboring cameras 110 may be determined using one or more of the camera capability information of the neighboring cameras 110, initial configuration information determined for the neighboring cameras 110, object analysis information determined by the camera 110, actions received at the camera 110 from one or more neighboring cameras 110 (e.g., where other neighboring cameras 110 are performing similar processes and providing actions to neighboring cameras 110 for use in configuring themselves to support collaborative analysis of an object 121), and the like, as well as various combinations thereof.

The preferred configurations of the neighboring cameras 110 may be specified in any suitable manner. For example, the preferred configuration of a neighboring camera 110 may be represented in absolute terms (e.g., by specifying the preferred settings themselves), in relative terms (e.g., by specifying a change needed to be made in order to set the neighboring camera 110 to the preferred settings), and the like, as well as various combinations thereof.

As described herein, in one embodiment, preferred configurations of the neighboring cameras 110 may be specified as actions to be performed by the neighboring cameras 110. In one such embodiment, a camera 110, when performing functions in support of collaborative analysis of an object 121, may generate actions to be performed by the identified neighboring cameras 110 for providing preferred configurations of the identified neighboring cameras 110 that will facilitate collaborative analysis of the object 121. It is noted that actions also may be referred to herein as tasks.

The action(s) generated for a neighboring camera 110, like the initial and preferred configuration information for a neighboring camera 110, may specify actions which, when executed by the neighboring camera 110, result in configuration of the neighboring camera 110 according to the preferred configuration. For example, the actions may include actions for setting one of more of a camera orientation of the neighboring camera 110 (e.g., the pan, tilt, and/or zoom settings of the neighboring camera 110), an image capture setting(s) of the neighboring camera 110 (e.g., setting to capture standard definition or high definition video, setting to record video for a certain length of time, and the like), a camera analysis setting(s) of the neighboring camera 110 (e.g., which types of object analysis functions are to be activated and/or deactivated), and the like, as well as various combinations thereof.

The action(s) for the neighboring camera(s) 110, like the preferred configurations of the neighboring cameras 110, may be determined using one or more of the camera capability information of the neighboring cameras 110, object analysis information determined by the camera 110, initial configuration information determined for the neighboring cameras 110, preferred configuration information computed for the neighboring cameras 110, actions received at the camera 110 from one or more neighboring cameras 110 (e.g., where other neighboring cameras 110 are performing similar processes and provide actions to neighboring cameras which the neighboring cameras 110 then use to configured themselves), and the like, as well as various combinations thereof.

For example, referring to the exemplary environment of FIG. 2, the first camera $110_1$ may determine preferred configurations for three neighboring cameras (e.g., second camera $110_2$, third camera $110_3$, and fifth camera $110_5$) as follows. For example, the preferred configuration for second camera $110_2$ may be specified as three actions to be performed by second camera $110_2$, as follows: (1) Action 1: rotate by 40 degrees via control of motors; (2) Action 2: tilt by 30 degrees via control of motors; and (3) Action 3: adjust lens to 4× zoom. For example, the preferred configuration for third camera $110_3$ may be specified as three actions to be performed by third camera $110_3$, as follows: (1) Action 1: rotate by 40 degrees via control of motors; (2) Action 2: adjust lens to 4× zoom; and (3) Action 3: activate facial recognition and face tracking functions. For example, the preferred configuration for fifth camera $110_5$ may be specified as two actions to be performed by fifth camera $110_5$, as follows: (1) Action 1: send a message to sixth camera $110_6$ to begin recording the scene in 3 minutes; and (2) Action 2: generate an alert for a security team. It will be appreciated that the foregoing actions are merely exemplary, and that first camera $110_1$ may determine any suitable numbers and types of actions for any suitable number of neighboring cameras 110.

Although primarily depicted and described herein as being separate steps performed by a camera 110, it will be appreciated that the steps of computing preferred configurations for the identified neighboring cameras 110 and generating actions to be performed by the identified neighboring cameras for collaborative analysis of the object 121 may be implemented as a single process whereby the camera 110 generates actions to be performed by the identified neighboring cameras for providing preferred configurations of the identified neighboring cameras 110 that will facilitate collaborative analysis of the object 121.

A camera 110, when performing functions in support of collaborative analysis of an object 121, may propagate generated actions to neighboring cameras 110 identified by the camera 110 as neighboring cameras 110 to collaborate with the camera 110 to provide collaborative analysis of the object 121. A neighboring camera 110, upon receiving the actions from camera 110 (and, optionally, from one or more other cameras 110 which also generate actions for the neighboring camera 110), may use the received actions for performing various functions.

A camera 110, upon receiving actions from a neighboring camera 110, may execute at least a portion of the generated actions for configuring itself according to the preferred configuration determined by the neighboring camera 110.

The actions received by the camera 110 may include only those generated actions intended for the camera 110 or may include generated actions intended for the camera 110 and one or more other cameras 110.

In one embodiment, the camera 110 receiving the actions may only execute actions intended for itself. In one embodiment, the camera 110 may execute all of the received actions intended for itself. In one embodiment, the camera 110 may not execute all of the received actions intended for itself, which may be the case where the camera 110 determines that one or more conditions have changed such that a particular action intended to be executed by the camera 110 should not be executed (e.g., based on analysis of the situation by the camera 110, based on a determination by the camera 110 that one or more other actions received from one or more other cameras take precedence over the particular action, and the like, as well as various combinations thereof). In such embodiments, the camera 110 may process the received actions prior to execution of any of the received actions.

In one embodiment, the camera 110 may execute one or more actions intended for one or more other cameras 110. This may be the case where the camera 110 determines that conditions have changed such that an action intended for a different camera should be executed locally (e.g., when the motion of the object 121 changes, in response to a determination that the other camera 110 for which the action was intended is unavailable to execute the action, and the like, as well as various combinations thereof). In such embodiments, again, the camera 110 may process the received actions prior to execution of any of the received actions.

As described above, a camera 110 that receives actions from one or more neighboring cameras 110 may process the received actions for determining which, if any, of the received actions are to be executed locally by the camera 110.

In one embodiment, processing of the actions by the camera 110 may be performed independent of the process by which the camera 110 generates actions to send to its neighboring cameras 110. In one embodiment, for example, processing of actions may include determining which actions to execute and which actions not to execute. In one embodiment, for example, the processing may include selection of certain actions over others (e.g., where two different neighboring cameras 110 provide two different or contradictory actions to the neighboring camera 110, the neighboring camera 110 may select one of the two actions to execute based on one or more factors, such as the time at which the actions were generated, identification of the neighboring cameras 110 from which the actions were received, and the like, as well as various combinations thereof). The processing may include any other suitable types of processing by which the camera 110 may facilitate collaborative analysis of the object 121.

In one embodiment, processing of the actions by the camera 110 may be performed in conjunction with the process by which the camera 110 generates actions to send to its neighboring cameras 110. For example, the received actions may be included as part of the camera capability information associated with a neighboring camera (e.g., where the action is indicative of a capability supported by the neighboring camera 110). For example, the received actions may be utilized as input information for determining the initial configuration information for a neighboring camera 110 (e.g., where is it known or expected that the neighboring camera 110 has already received and executed the action). For example, the received actions may be utilized as input information for determining the preferred configurations for one or more neighboring camera 110. The processing may include any other suitable types of processing by which the camera 110 may facilitate collaborative analysis of the object 121.

In this manner, by executing the various processes and/or portions of processes and performing the various functions depicted and described with respect to cameras 110, the cameras 110 are able to collaborate, in real time, to perform analysis of an object 121, even while the object 121 is in motion. It will be appreciated that the various processes and functions described herein as being performed by each of the cameras 110 may be implemented in a number of ways (e.g., using any suitable types and numbers of modules arranged in any configuration suitable for supporting such processes and functions). An exemplary embodiment of a camera 110 configured for collaborating with one or more neighboring cameras to provide collaborative analysis of an object 121 is depicted and described with respect to FIG. 3.

Figure 3:
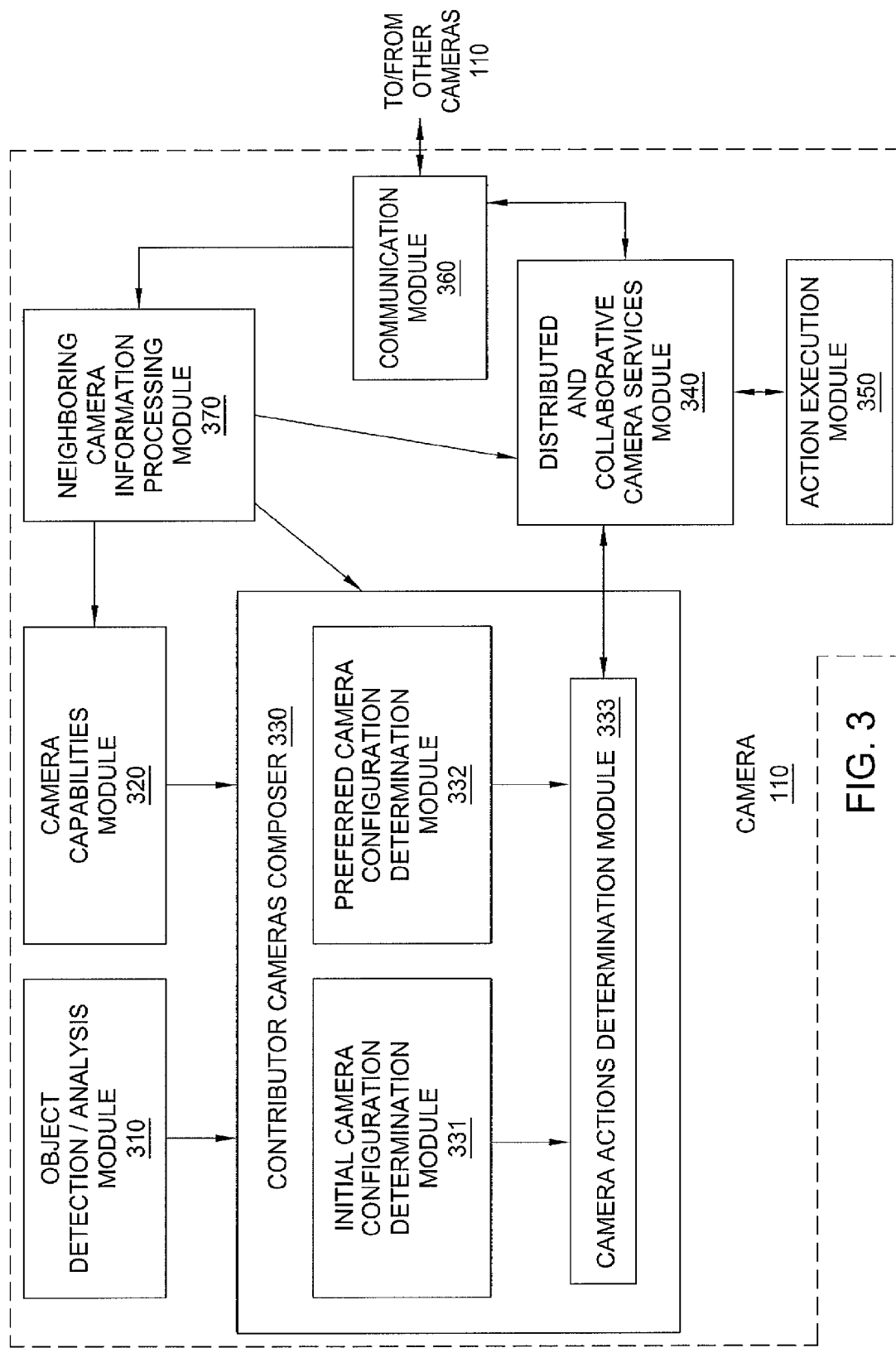
FIG. 3 depicts an exemplary camera configured for use in a collaborative object analysis system.

FIG. 3 depicts an exemplary camera configured for use in a collaborative object analysis system.

As depicted in FIG. 3, exemplary camera 110 includes an object detection/analysis module 310, a camera capabilities module 320, a contributor camera composer 330, a distributed and collaborative camera services module 340, an action execution module 350, a communication module 360, and a neighboring camera information processing module 370.

The object detection/analysis module 310 is configured for detecting an object 121 within the field of vision of the camera and analyzing the object 121 (and, optionally, portions of the surrounding environment) to generate object analysis information associated with the object 121. The object detection/analysis module 310 provides the object analysis information to the contributor cameras composer 330 for use in generating actions to be performed in collaborative analysis of object 121.

The camera capabilities module 320 is configured for maintaining camera capability information for camera 110 and one or more neighboring cameras, and providing the camera capability information to contributor cameras composer 330 for use in generating actions to be performed in collaborative analysis of object 121. The camera capabilities module 320 may maintain camera configuration information for the camera 110 and various neighboring cameras. The camera capabilities module 320 may receive camera configuration information for neighboring cameras from communication module 360 (e.g., via communication of camera 110 with the neighboring cameras, via communication of the camera 110 with a central server or management system, and the like, as well as various combinations thereof). The camera capabilities module 320 may provide camera configuration information for camera 110 to one or more neighboring nodes via communication module 360.

The contributor cameras composer 330 is configured for receiving the object analysis information from object detection/analysis module 310 and for receiving the camera capability information from camera capabilities module 320. The contributor cameras composer 330 also may be configured for receiving various other types of information which may be used in generating actions to be performed in order to provide collaborative analysis of object 121. The contributor cameras composer 330 is configured for generating actions to be performed in collaborative analysis of object 121, which may include one or more actions to be executed locally by camera 110 and/or one or more actions to be propagated to one or more neighboring cameras for execution by the neighboring camera(s). The contributor cameras composer 330 may generate the actions using various combinations of the received information.

The contributor cameras composer 330 includes an initial camera configuration determination module 331, a preferred camera configuration determination module 332, and a camera action determination module 333.

The initial camera configuration determination module 331 is configured for determining the initial configuration information for the local camera 110 and/or for one or more of the neighboring cameras. The initial camera configuration determination module 331 may determine the initial configuration information in any suitable manner as described herein (e.g., using camera capability information from camera capabilities module 320, by querying one or more neighboring cameras, and the like). The initial camera configuration determination module 331 provides the initial camera configuration information to camera action determination module 333.

The preferred camera configuration determination module 332 is configured for determining the preferred configuration information for the local camera 110 and/or for one or more of the neighboring cameras. The preferred camera configuration determination module 332 may determine the preferred configuration information in any suitable manner as described herein (e.g., using object analysis information from object detection/analysis module 310, using camera capability information from camera capabilities module 320, and the like). The preferred camera configuration determination module 332 provides the preferred camera configuration information to camera action determination module 333.

The camera action determination module 333 is configured for receiving the initial configuration information from initial camera configuration determination module 331 and the preferred configuration information from preferred camera configuration determination module 332, and for using the initial configuration information and the preferred configuration information to generate actions to be performed in order to provide collaborative analysis of object 121. The camera action determination module 333 is configured for providing the generated actions to the distributed and collaborative camera services module 340.

The distributed and collaborative camera services module 340 is configured for receiving the generated actions from the contributor cameras composer 330 and for processing the actions for determining which of the generated actions to execute locally and which of the actions to propagate toward neighboring cameras. For actions to be executed locally, distributed and collaborative camera services module 340 provides the actions to action execution module 350. For actions to be propagated to neighboring cameras, distributed and collaborative camera services module 340 provides the actions to communication module 360 for propagation to neighboring cameras.

The action execution module 350 is configured for executing actions locally at camera 110. As described herein, the actions may include actions for controlling movement of the camera 110 (e.g., pan and tilt) for tracking the object 121, actions for controlling the amount of zoom used by the camera for analyzing the object 121, actions for controlling analysis capabilities of the camera 110 that are activated and used for analyzing the object 121, and the like, as well as various combinations thereof. Thus, action execution module 350 is configured for processing actions for use in generating control signals configured for implementing the actions (e.g., control signals for controlling one or more motors responsible for controlling the pan and/or tilt of camera 110, control signals for controlling the amount of zoom of the camera, control signals for controlling the types of analysis functions used by the camera 110 for analyzing the object 121, and the like, as well as various combinations thereof).

The communication module 360 is configured for communicating with neighboring cameras for providing various functions in support of collaborative analysis of object 121.

The communication module 360 is configured for facilitating exchange of camera capabilities information between cameras. For example, the communication module 360 is configured for receiving camera capabilities information from neighboring cameras and providing the camera capabilities information to camera capabilities module 320 (and/or to neighboring camera information processing module 370, which may process the camera capabilities information before providing the camera capabilities information to camera capabilities module 320 and/or any other suitable module of camera 110), receiving camera capability information associated with camera 110 from camera capabilities module 320 and propagating the camera capability information of camera 110 toward neighboring cameras, and the like.

The communication module 360 is configured for facilitating exchange of camera actions between cameras. For example, communication module 360 is configured for receiving locally generated camera actions from the distributed and collaborative camera services module 340 and propagating the camera actions toward neighboring cameras, receiving remotely generated camera actions from neighboring cameras and providing the camera actions to neighboring camera information processing module 370, and the like.

The neighboring camera information processing module 370 is configured for receiving, via communication module 360, information from neighboring cameras. As described herein, the information from neighboring cameras may include camera capabilities information from neighboring cameras, camera actions generated by neighboring cameras, and/or any other suitable information which may be exchanged between cameras for providing collaborative analysis of objects 121.

The neighboring camera information processing module 370 is configured for providing received camera capabilities information to one or more of camera capabilities module 320 (e.g., for storage and such that camera capabilities module 320 may make the camera capabilities information available to contributor camera composer 330), contributor camera composer 330 (e.g., for use in determining initial configuration information, preferred configuration information, camera actions, and the like), or any other suitable module(s).

The neighboring camera information processing module 370 is configured for providing received camera actions to one or more of contributor camera composer 330 (e.g., for use in determining initial configuration information, preferred configuration information, camera actions, and the like), distributed and collaborative camera services module 340 (e.g., for use in determining whether camera actions intended for other cameras should be executed locally by the camera 110), an action execution module 350 (e.g., where one or more of the received actions are intended for camera 110 and should be executed by action execution module 350 of camera 110), or any other suitable module(s).

It is noted that the exemplary camera of FIG. 3 merely represents one implementation of a camera for providing various functions of the collaborative object analysis capability Although primarily depicted and described herein with respect to an embodiment in which a camera configured for providing various functions of the collaborative object analysis capability is implemented using specific numbers and types of modules arranged in a particular manner, it will be appreciated that a camera configured for providing various functions of the collaborative object analysis capability may be implemented in any other suitable manner. A more general embodiment of a camera configured for providing the collaborative object analysis capability is depicted and described with respect to FIG. 4.

Figure 4:
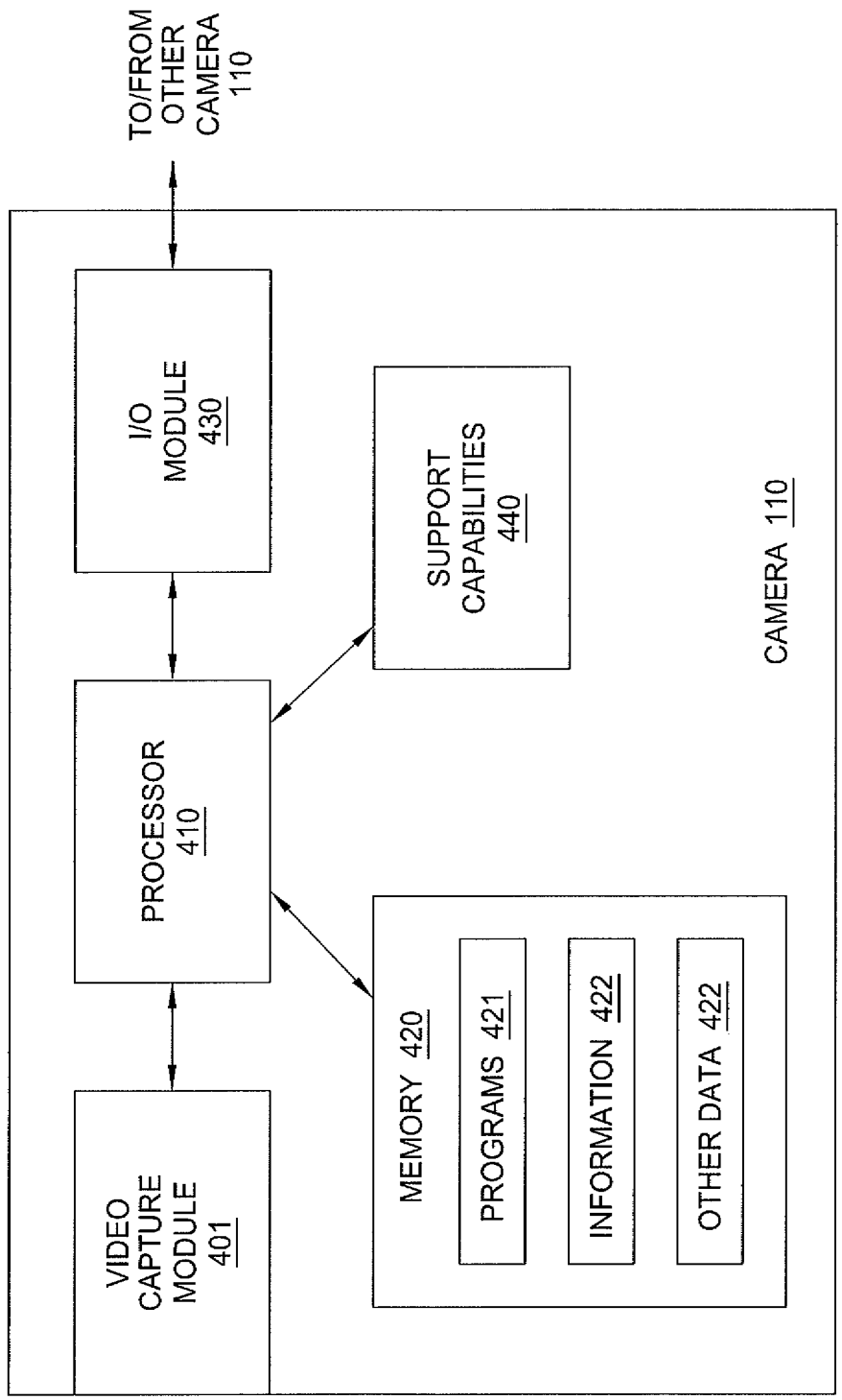
FIG. 4 depicts an exemplary camera configured for use in a collaborative object analysis system.

FIG. 4 depicts an exemplary camera configured for use in a collaborative object analysis system.

As depicted in FIG. 4, the exemplary camera includes a video capture module 401, a processor 410, a memory 420, an input/output (I/O) module 430, and support circuits 440. The processor 410 is coupled to each of the video capture module 401, the memory 420, the I/O module 430, and the support capabilities 440 for controlling various functions of the collaborative object analysis capability.

The video capture module 401 is configured for capturing video and providing the captured video to processor 410 for processing.

The processor 410 is configured for cooperating with each of the video capture module 401, the memory 420, the I/O module 430, and the support capabilities 440 in order to provide various functions depicted and described herein. The processor 410 may process video from video capture module 401, execute various programs and software instructions for controlling exchange of camera capability information with neighboring cameras, determining and/or processing various types of information in support of the collaborative object analysis capability (e.g., initial configuration information, preferred configuration information, camera actions, and the like, as well as various combinations thereof), and the like, as well as various combinations thereof.

The memory 420 is configured for storing various programs 421, information 422, and other data 423 in support of the collaborative object analysis capability. For example, the programs 421 may include programs which may be executed by processor 410 for detecting an object 121 in video captured by video capture module 401, analyzing an object detected by camera 110, determining and providing camera capabilities information to neighboring cameras, receiving and processing camera capabilities information from neighboring cameras, determining configuration information (e.g., initial configuration information, preferred configuration information, and the like), determining camera actions, executing camera actions, and the like, as well as various combinations thereof. The information associated with such functions is depicted as information 422, which may include input and output information associated with performance of such functions. It is noted that various other types of data also may be stored.

The I/O module 430 is configured for facilitating communications for camera 410 (e.g., between the camera 110 and neighboring cameras, between the camera 110 and collaborative cameras server 130, and the like). The I/O module 430 may operate in a manner similar to communications module 360 depicted and described with respect to FIG. 3.

The support capabilities 440 may include any other suitable camera capabilities which may be utilized for providing the collaborative object analysis capability. For example, the support capabilities 440 may include motors (e.g., for controlling the positioning of the camera), support circuits, power supplies, and the like.

Although primarily depicted and described herein with respect to embodiments in which a camera is a single physical device including video capture capabilities and associated processing capabilities for providing various functions of collaborative object analysis capability, it is noted that one of more of the cameras 110 may be implemented in a physically distributed manner. In one embodiment, for example, a camera 110 may be implemented as: (1) a video capture device configured to provide the video capture functions (but excluding some of all of the processing capabilities described herein as being provided by the camera 110) and (2) an associated computing device (e.g., where the camera is a peripheral of the computing device or otherwise associated with the computing device) configured to provide various processing capabilities for providing various functions of collaborative object analysis capability (e.g., determination of actions for neighboring cameras 110, local execution of actions received from neighboring cameras, video analysis processing, and the like, as well as various combinations thereof). In one embodiment, for example, a single computing device may provide processing capabilities for a plurality of such video capture device (e.g., cameras that are configured to provide the video capture functions but which exclude the processing capabilities described herein as being provided by the camera 110). In at least some such embodiments, the combination of the multiple physical devices providing the functions described herein as being provided by a camera 110 (e.g., a video capture device and its associated computing device) may be considered to be a camera 110 as depicted and described herein. Thus, although primarily depicted and described herein with respect to embodiments in which the various functions of the collaborative object analysis capability are implemented within cameras, it is noted that the various functions of the collaborative object analysis capability which are depicted and described as being performed by a camera may be distributed across multiple elements.

As described herein, various types of camera information may be exchanged between the cameras 110 in support of the collaborative object analysis capability. For example, cameras 110 may exchange camera capabilities information, camera actions, and the like, as well as various combinations thereof. The camera information exchanged between cameras 110 may be exchanged in any suitable manner. For example, the camera information exchanged between cameras 110 may be exchanged using any suitable protocol(s), any suitable formatting language (e.g., Extensible Markup Language (XML), JavaScript Object Notation (JSON), and the like), and the like, as well as various combinations thereof. An exemplary use of XML to encode camera capabilities information and camera actions is depicted and described with respect to FIGS. 5A and 5B.

Figure 5A:
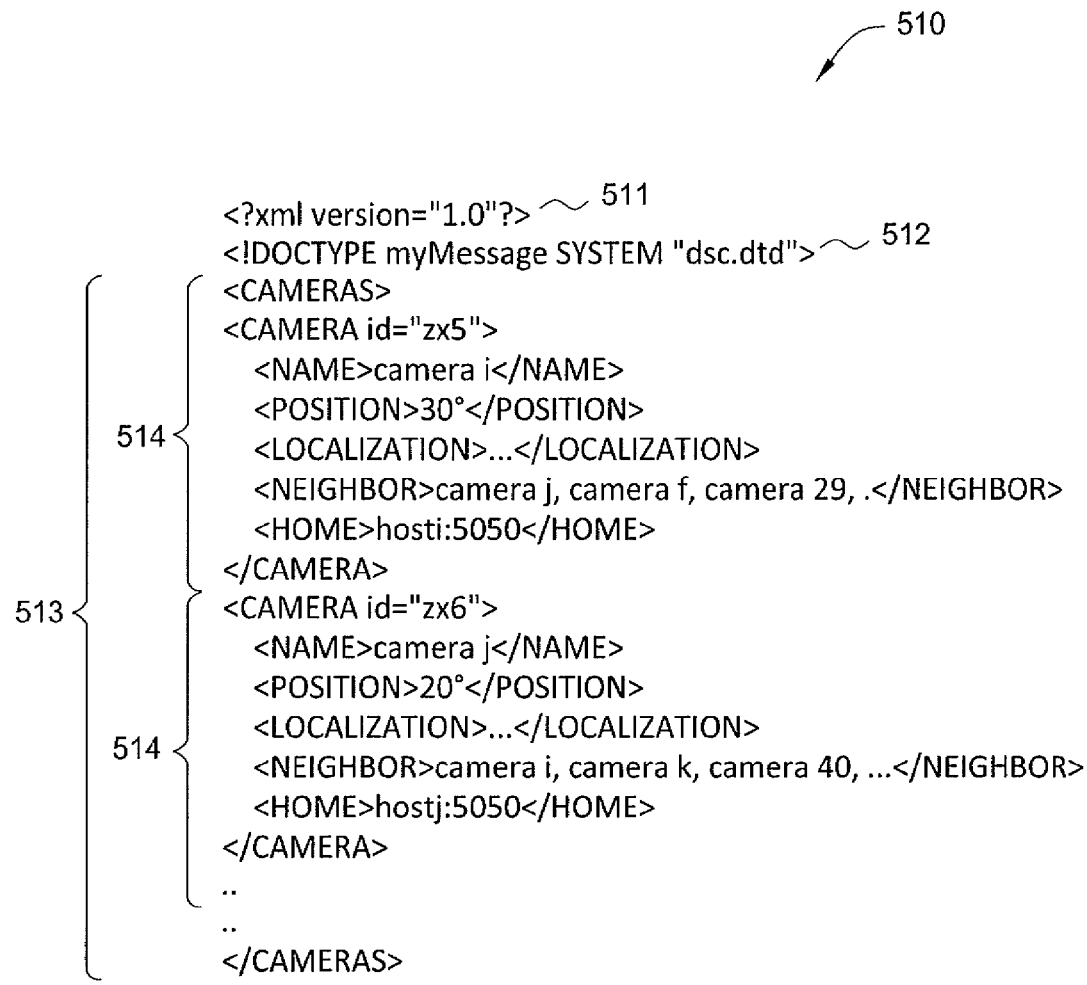

FIGS. 5A and 5B depict an exemplary use of XML for encoding camera information exchanged between cameras of a collaborative object analysis system.

FIG. 5A depicts an exemplary XML file illustrating use of XML to encode camera capabilities of a plurality of cameras. As depicted in FIG. 5A, the exemplary XML file 510 includes XML version information 511, document type information 512, and a payload portion 513 (having a beginning and an end indicated by <CAMERAS> and </CAMERAS>, respectively) including one or more sets of camera capabilities information 514 for one or more respective cameras (each set of camera capability information having a beginning and an end indicated by <CAMERA id="xxx">> and </CAMERA>, respectively). As depicted in FIG. 5A, each set of camera capabilities information 514 includes information for the associated camera (e.g., a NAME field for indicating the name of the camera, a POSITION field for indicating a position/orientation of the camera, a LOCALIZATION field for indicating a geographic location of the camera, a NEIGHBOR field for indicating any neighboring cameras, a HOME field for indicating hosting of the camera, and the like). It will be appreciated that XML file 510 is merely exemplary, and that the XML file 510 may include various other types of camera capabilities information for each camera identified in the XML file 510. It will be appreciated that, although primarily depicted and described in FIG. 5A with respect to specific types, numbers, names, and arrangement of fields and associated camera information, an XML file including camera capabilities information may be configured in any other suitable manner (e.g., using any other suitable types, numbers, names, and/or arrangements of fields and/or associated camera capabilities information).

FIG. 5B depicts an exemplary XML file illustrating use of XML to encode camera actions. As depicted in FIG. 5B, the exemplary XML file 520 includes XML version information 521, document type information 522, and a payload portion 523 (having a beginning and an end indicated by <CAMERA MESSAGE> and </CAMERA MESSAGE>, respectively). The payload portion 523 includes (1) information associated with the camera from which the exemplary XML file is received (denoted as camera information 524) and (2) one or more camera actions 525 intended for execution by one or more respective cameras (in this case, illustrated as actions 1 and k). The camera information 524 is similar to information described with respect to FIG. 5A. As depicted in FIG. 5B, the first action $525_1$ (denoted as TASK 1) is intended to be executed by camera f (as indicated in the NEXT_HOST field). As also depicted in FIG. 5B, the second action $525_2$ (denoted as TASK k) is intended to be executed by camera k (as indicated in the NEXT_HOST field).

With respect to FIG. 5A and FIG. 5B, it is noted that the arrangements of the exemplary XML files, the field names used in the exemplary XML files, and like characteristics of the exemplary files may be modified in any suitable manner.

Figure 6:
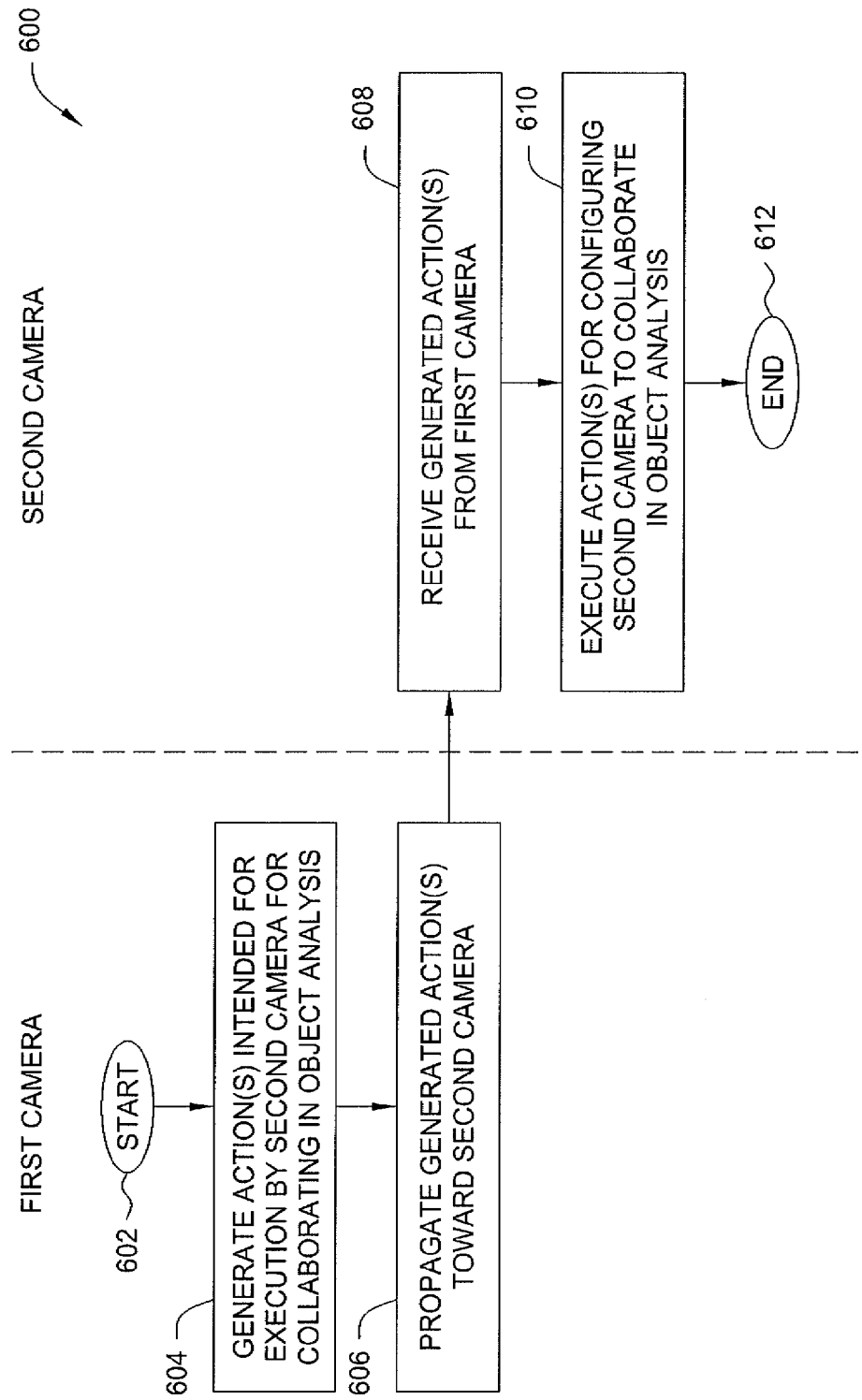
FIG. 6 depicts one embodiment of a method for generating actions at a first camera for execution at a second camera.

FIG. 6 depicts one embodiment of a method for generating actions at a first camera for execution at a second camera.

At step 602, method 600 begins.

At step 604, the first camera generates actions intended for execution by a second camera. Various embodiments for generation of actions at a first camera where the actions are intended for execution by a second camera are depicted and described herein with respect to FIGS. 3-4 and, thus, the various functions depicted and described with respect to FIGS. 3 and 4 may be implemented as part of this step of method 600.

At step 606, the first camera propagates the generated actions toward the second camera.

At step 608, the second camera receives the generated actions from the first camera.

At step 610, the second camera executes one or more of the generated actions. Various embodiments for determining execution of actions at a second camera where the actions were generated by a first camera are depicted and described herein with respect to FIGS. 3-4 and, thus, the various functions depicted and described with respect to FIGS. 3 and 4 may be implemented as part of this step of method 600.

At step 612, method 600 ends.

Although often depicted and described with respect to functions being perform by cameras 110 in a linear fashion (for purposes of clarity), it will be appreciated that the cameras 110 may continually operate to perform various functions depicted and described herein for continually adapting analysis of an object 121 according to real-time conditions (e.g., reevaluating actions to be performed locally and/or by neighboring cameras 110 based on changing conditions, modifying actions to be performed locally and/or by neighboring cameras 110 based on changing conditions, generating and propagating new and/or different sets of actions for neighboring cameras 110 based on changing conditions, and the like, as well as various combinations thereof).

Although primarily depicted and described herein with respect to performing collaborative analysis of a single object, it will be appreciated that the collaborative object analysis capability may be used for performing collaborative analysis of multiple objects (e.g., where the objects are analyzed individually but contemporaneously, where the objects are analyzed as a group, and the like, as well as various combinations thereof).

As described herein, the collaborative object analysis capability provides various advantages.

For example, various embodiments of the collaborative object analysis capability may provide effective analysis of moving objects (e.g., people, vehicles, and the like), robustness due to the distributed nature of the camera system, and the like.

For example, various embodiments of the collaborative object analysis capability may provide many types of savings (e.g., the low costs of the cameras, energy savings due to the ability to limit transmission and storage of video data, a reduction in the number of servers needed to process camera data, and the like). These savings are significant when compared to the resources consumed in existing video surveillance solutions which utilize centralized processing of data provided by many cameras, which is quite expensive in terms of network resources (e.g., energy, processing, and the like). For example, video transfers via a network consume large amounts of energy (e.g., in many systems, communication is 100 to 1000 times more expensive in energy than in computation).

Although primarily depicted and described herein with the context of embodiments in which the various functions of the collaborative object analysis capability are distributed across the cameras 110, it is noted that in one or more other embodiments at least a portion of the functions depicted and described herein as being provided by the cameras 110 may be provided by one or more central controllers (e.g., by collaborative cameras server 130 and/or any other suitable control devices configured to perform such functions).

Various other advantages have been described herein and, further, will be recognized from the descriptions of the collaborative object analysis capability provided herein.

Figure 7:
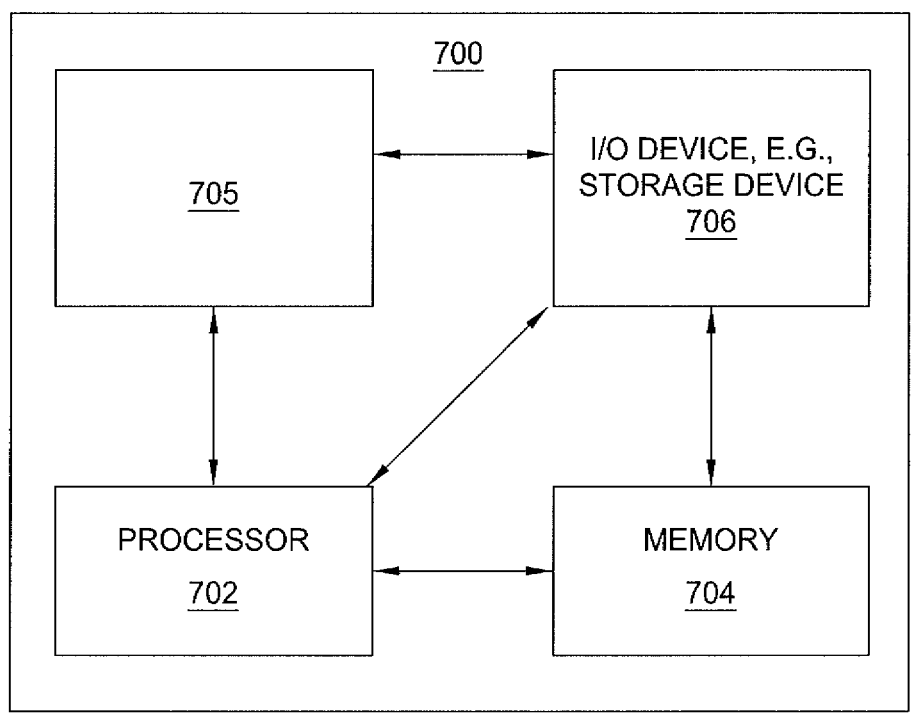
FIG. 7 depicts a high-level block diagram of a computer suitable for use in performing the functions described herein.

FIG. 7 depicts a high-level block diagram of a computer suitable for use in performing functions described herein.

As depicted in FIG. 7, computer 700 includes a processor element 702 (e.g., a central processing unit (CPU) and/or other suitable processor(s)) and a memory 704 (e.g., random access memory (RAM), read only memory (ROM), and the like).

The computer 700 also may include a cooperating module or process 705 and/or various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)). In one embodiment, the cooperating process 705 can be loaded into memory 704 and executed by processor 702 to implement the functions as discussed herein. Thus, cooperating process 705 (including associated data structures) can be stored on a computer readable storage medium, e.g., RAM memory, magnetic or optical drive or diskette, and the like.

It will be appreciated that computer 700 depicted in FIG. 7 provides a general architecture and functionality suitable for implementing functional elements described herein and/or portions of functional elements described herein. For example, the computer 700 provides a general architecture and functionality suitable for implementing one or more of the cameras 110.

It will be appreciated that the functions depicted and described herein may be implemented in software for executing on a general purpose computer so as to implement a special purpose computer, and/or may also be implemented on hardware, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
analyze, at a first camera, an object detected by the first camera to determine object analysis information associated with the object;
identify, at the first camera, a second camera configured to facilitate analysis of the object, wherein the second camera is selected based on a camera capability of the second camera and the object analysis information associated with the object, wherein the camera capability of the second camera comprises a video processing speed of the second camera;
generate, at the first camera, based on at least one of the camera capability of the second camera and the object analysis information associated with the object, an action adapted for use by the second camera to facilitate analysis of the object; and
propagate the action from the first camera toward the second camera.

2. The apparatus of claim 1, wherein, to identify the second camera, the processor is configured to:
select the second camera, from among a plurality of available cameras, based on respective camera capability information associated with the available cameras.

3. The apparatus of claim 1, wherein, to identify the second camera as a camera configured to facilitate analysis of the object, the processor is configured to:
determine a location of the second camera;
determine movement information associated with the object, wherein the movement information is indicative of at least one of a movement of the object and an expected movement of the object; and
identify the second camera as a camera configured to facilitate analysis of the object based on the location of the second camera and the movement information associated with the object.

4. The apparatus of claim 1, wherein, to identify the second camera as a camera configured to facilitate analysis of the object, the processor is configured:
determine, based on the camera capability of the second camera, an analysis capability supported by the second camera for facilitating analysis of the object; and
identify the second camera as a camera configured to facilitate analysis of the object based on the analysis capability supported by the second camera.

5. The apparatus of claim 1, wherein, the processor is configured to:
determine an initial configuration of the second camera; and
determine a preferred configuration of the second camera;
wherein the action is configured for causing reconfiguration of the second camera from the initial configuration to the preferred configuration.

6. The apparatus of claim 5, wherein at least one of the initial configuration of the second camera and the preferred configuration of the second camera is determined based on the camera capability of the second camera.

7. The apparatus of claim 1, wherein the processor is configured to:
determine a preferred configuration of the second camera; and
generate the action for causing configuration of the second camera according to the preferred configuration.

8. The apparatus of claim 1, wherein the object analysis information comprises at least one of an object type of the object and movement information indicative of at least one of a movement of the object and an expected movement of the object.

9. The apparatus of claim 1, wherein the processor is configured to:
receive camera capability information associated with the second camera; and
store, at the first camera, the camera capability information associated with the second camera.

10. The apparatus of claim 1, wherein the processor is configured to:
propagate, from the first camera toward the second camera, a message including camera capability information associated with the first camera.

11. The apparatus of claim 1, further comprising at least one of:
a video capture mechanism configured for capturing video; and
a memory configured for storing at least one of captured video and object analysis information.

12. The apparatus of claim 1, wherein the camera capability of the second camera comprises a software capability of the second camera.

13. The apparatus of claim 12, wherein the software capability of the second camera comprises an embedded analysis capability of the second camera.

14. The apparatus of claim 1, wherein the camera capability of the second camera comprises a hardware capability of the second camera.

15. A method, comprising:
using a processor and a memory for:
analyzing, at a first camera, an object detected by the first camera to determine object analysis information associated with the object;
identifying, at the first camera, a second camera configured to facilitate analysis of the object, wherein the second camera is selected based on a camera capability of the second camera and the object analysis information associated with the object, wherein the camera capability of the second camera comprises a video processing speed of the second camera;
generating, at the first camera, based on at least one of the camera capability of the second camera and the object analysis information associated with the object, an action adapted for use by the second camera to facilitate analysis of the object; and
propagating the action from the first camera toward the second camera.

16. An apparatus, comprising:
a processor and a memory communicatively connected to the processor, the processor configured to:
receive, at the apparatus from a first camera, a first action and a second action, wherein the first action and the second action are associated with analysis of an object detected by the first camera, wherein the second action is intended for the apparatus;
configure the apparatus based on the first action, wherein the configuration of the apparatus facilitates analysis of the object by the apparatus; and
determine, by the apparatus based on at least one of information associated with the apparatus or information associated with a second apparatus, not to configure the apparatus based on the second action.

17. The apparatus of claim 16, wherein the information associated with the second apparatus comprises at least one of a status of the second apparatus and capability information associated with the second apparatus.

18. The apparatus of claim 16, wherein the processor is configured to:
   propagate the second action toward the second apparatus.

19. An apparatus, comprising:
   a processor and a memory communicatively connected to the processor, the processor configured to:
   receive, at the apparatus from a first camera, a first action and a second action, wherein the first action and the second action are associated with analysis of an object detected by the first camera, wherein the second action is intended for a second apparatus;
   configure the apparatus based on the first action, wherein the configuration of the apparatus facilitates analysis of the object by the apparatus; and
   select the second action for processing by the apparatus, instead of by the second apparatus, based on at least one of information associated with the apparatus or information associated with the second apparatus.

20. The apparatus of claim 19, wherein the information associated with the second apparatus comprises at least one of a status of the second apparatus and capability information associated with the second apparatus.

* * * * *